Patented Oct. 7, 1952

2,613,220

UNITED STATES PATENT OFFICE 2,613,220

MANUFACTURE OF TRICHLOROACETIC ACID AND DERIVATIVES

Charles M. Eaker, Affton, Mo., assignor to Monsanto Chemical Company, St. Louis, Mo., a corporation of Delaware No Drawing. Application October 14, 1950, Serial No. 190,247

13 Claims. (Cl. 260—487)

This invention relates to trichloroacetic acid; more specifically, this invention relates to an improved process for the production of trichloroacetic acid and compounds prepared therefrom.

Trichloroacetic acid is a well known article of commerce utilized in the preparation of many organic chemicals. Substantially pure trichloroacetic acid has a crystallizing point of approximately 58° C. In most industrial organic syntheses utilizing trichloroacetic acid, it is preferred that trichloroacetic acid be of such a degree of purity so as to have a crystallizing point greater than about 51° C., with such a composition containing in excess of 90% by weight of trichloroacetic acid. As usually prepared, the balance of such compositions is made up of dichloroacetic acid and a very minor amount of monochloroacetic acid. Various procedures for the preparation of such a commercial grade of trichloroacetic acid have been disclosed in the prior art. However, the procedure most frequently used is the direct chlorination of acetic acid in the presence of catalytic quantities, of the order of 5% or less, of such catalysts as acetic anhydride, acetyl chloride, sulfur, phosphorus, the oxides and chlorides of phosphorus and sulfur, etc., until the reaction product contains approximately 90% trichloroacetic acid. Higher chlorination usually results in decomposition. This procedure for the production of trichloroacetic acid has a significant deficiency, namely, an exceptionally long chlorination time cycle is required in order to produce a reaction product having a trichloroacetic acid content in excess of 90%.

It is an object of this invention to provide an improved process for the production of trichloroacetic acid.

It is a further object of this invention to provide an improved process for the production of commercial grade trichloroacetic acid and compounds prepared therefrom.

Further objects will become apparent from a description of the novel process of this invention.

It has now been discovered that at essentially the same comparative chlorine efficiency as shown by the percentage of chlorine present in the off-gas, with zero percent chlorine indicating 100% chlorine efficiency, a mixture containing from about 15% to about 75% glacial acetic acid and 85% to 25% acetic anhydride may be chlorinated to approximately 90% trichloroacetic acid in approximately half the time that would be required to chlorinate a mixture of glacial acetic acid and catalytic quantities of acetic anhydride or other catalysts to a reaction product containing the same trichloroacetic acid content. It has further been found that the reaction product obtained by chlorinating a mixture containing from about 15% to about 75% glacial acetic acid and from about 85% to about 25% acetic anhydride up to approximately 90% of the trichloroacetic acid stage, contains a significant quantity of trichloroacetyl chloride as a side reaction product therein. Since trichloroacetyl chloride is hydrolyzable with water to form trichloroacetic acid or may be reacted with other compounds to form the same derivatives of trichloroacetic acid obtained when trichloroacetic acid is reacted with the same compound, the reaction product obtained according to the novel process of this invention may be treated with water to convert the trichloroacetyl chloride to trichloroacetic acid, thereby resulting in a reaction product containing in excess of 90% trichloroacetic acid and having a crystallizing point in excess of 51° C. after removal of HCl, or the reaction product may be utilized as such for the preparation of compounds prepared from trichloroacetic acid without first converting the trichloroacetyl chloride contained therein into trichloroacetic acid.

According to a preferred embodiment of the novel process of this invention, therefore, a mixture containing from about 15% to about 75% glacial acetic acid and from about 85% to about 25% acetic anhydride is chlorinated to approximately the trichloroacetic acid stage, and preferably to the point where the addition of water to the reaction product in an amount sufficient to hydrolyze the hydrolyzable impurities contained therein, results in a reaction product having a crystallizing point in excess of 51° C. after removal of the hydrogen chloride gas formed during the hydrolysis.

Accordingly, another preferred embodiment of the novel process of this invention comprises reacting the reaction mixture obtained by chlorinating a mixture containing about 15% to about 75% glacial acetic acid and about 85% to 25% acetic anhydride to approximately the trichloro stage, under such conditions that the trichloroacetyl chloride contained in said reaction mixture is converted to the same compound as is the trichloroacetic acid also contained in said reaction mixture.

A comparison of the data set forth in the following examples will illustrate the unusual characteristics of the novel process of this invention. Example I is illustrative of the process described in the prior art. In these examples all parts are by weight unless otherwise noted.

*Example I*

In this and subsequent examples, the apparatus utilized in carrying out the chlorination procedure described consists of a glass chlorinator equipped with an efficient agitator, a thermometer, chlorine injection tube and an efficient brine or water cooled condenser. Provision is also made for the absorption of the hydrogen chloride gas formed during the reaction and passed out of the reaction vessel into the condenser, and also for the periodic collection and analysis of the gases being evolved from the reaction mixture.

A mixture containing 28 parts of acetic anhydride and 542 parts of glacial acetic acid is charged to the chlorinator and with constant agitation, heated to a temperature of about 95° C. When this temperature has been reached, gaseous chlorine is introduced into the reaction mixture at the rate of about 40 parts per hour. Initially, substantially complete chlorine absorption is obtained as evidenced by the off gas analysis, showing substantially 100% hydrogen chloride and negligible quantities of free chlorine. When approximately 30% conversion to the monochloro stage has been reached, chlorine efficiency significantly drops as shown by exceptionally large quantities of free chlorine in the off gas. At this point, the rate of chlorine addition is lowered to about 10 parts per hour, and this rate of addition continued until substantially complete conversion to the monochloro stage has been reached.

When this monochloro stage has been reached, the temperature is raised to about 150° C. At this temperature, chlorination is continued with the addition of chlorine at a rate of approximately 5–25 parts per hour.

When the reaction mixture contains at least 90% trichloroacetic acid and has a crystallizing point in excess of about 51° C., chlorination is stopped and the reaction mixture allowed to cool. The reaction mixture thus obtained is commercial grade trichloroacetic acid. Total elapsed time required for chlorinating the initial mixture to a reaction product containing at least 90% trichloroacetic acid is approximately 120 hours.

*Example II*

A mixture containing 25 parts of acetic anhydride and 75 parts of glacial acetic acid is charged to the chlorinator described in Example I and with constant agitation, heated to a temperature of about 95° C. When this temperature has been reached, gaseous chlorine is introduced into the reaction mixture at such a rate that substantially complete absorption takes place with negligible quantities of free chlorine being present in the off-gas.

While maintaining a temperature within the range of 70°–110° C., chlorination is continued until the monochloroacetic acid stage has been reached, at which point the temperature is rapidly raised to about 150° C. While maintaining this latter temperature, chlorination is continued at the same comparative chlorine efficiency as was maintained in Example I.

As the trichloroacetic acid stage is approached, samples are periodically withdrawn from the chlorinator and the hydrolyzable impurities in such samples hydrolyzed by the addition of a small amount of water, heating to a temperature of about 100° C. and removing the hydrogen chloride gas formed. The crystallizing point of the thus hydrolyzed reaction product is then determined. When the crystallizing point of such a hydrolyzed sample is in excess of 51° C., chlorination of the reaction mixture is stopped. Such a chlorination stage is reached in approximately 60 hours.

The reaction product thus obtained, prior to hydrolysis, has a crystallizing point slightly less than 51° C. and a trichloroacetic acid content of slightly lower than 90%. The reaction product can be converted into a reaction product containing in excess of 90% trichloroacetic acid by adding approximately 1.5% by weight of water to the reaction product, heating to a temperature of about 100° C., and removing the hydrogen chloride gas formed, thereby hydrolyzing the trichloroacetyl chloride contained in the reaction product to trichloroacetic acid. The reaction product then contains in excess of 90% trichloroacetic acid and has a crystallizing point greater than 51° C.

In view of the composition of the reaction product prior to hydrolysis as above described, the reaction product prior to hydrolysis can be utilized in organic syntheses carried out in an aqueous medium, as under such conditions hydrolysis of the trichloroacetyl chloride to trichloroacetic acid will take place during the organic syntheses, or the reaction product prior to hydrolysis may be reacted under such conditions that the trichloroacetyl chloride contained in said reaction product is converted to the same compound as is the trichloroacetic acid also contained in the reaction product.

A comparison of the procedure set forth in Example II with that set forth in Example I indicates the outstanding utility of the novel process of this invention and the resulting significant improvement obtained by this novel process over the process heretofore used. According to the process described in the prior art, approximately 120 hours was required to obtain a usable, satisfactory trichloroacetic acid composition, i. e., a composition containing in excess of 90% trichloroacetic acid. According to the novel process of this invention, when carried out under similar circumstances, only approximately 60 hours is required to obtain the same type of product.

*Example III*

In accordance with the procedure described in Example II, a mixture containing 42 parts of acetic anhydride and 58 parts of glacial acetic acid is chlorinated with gaseous chlorine. Chlorination is stopped when the crystallizing point of the reaction mixture is 49.2° C. Such a reaction product is obtained in approximately 60 hours. Hydrolysis of the reaction product results in a product having a crystallizing point of 54.3° C.

*Example IV*

The procedure described in Example II is repeated utilizing a mixture containing 60 parts of acetic anhydride and 40 parts of glacial acetic acid. Approximately 60 hours is required to obtain a reaction product which, on hydrolysis of the trichloroacetyl chloride contained therein, will have a crystallizing point in excess of 51° C. after removal of the hydrogen chloride formed and a trichloroacetic acid content in excess of 90%.

Example V

The procedure described in Example II is repeated utilizing a mixture containing 85 parts of acetic anhydride and 15 parts of glacial acetic acid. In approximately 60 hours, a reaction product is obtained which, upon hydrolysis of the trichloroacetyl chloride contained therein, yields a reaction product having a crystallizing point in excess of 51° C. after removal of the hydrogen chloride formed and a trichloroacetic acid content greater than about 90%.

It will be apparent to those versed in the art that the novel process of this invention as set forth in the preceding Examples II to V is subject to substantial variation. During chlorination, for example, the temperature may be varied over a wide range, such as in the range of from about 70° C. to about 170° C. Procedurally, it has been found particularly advantageous to maintain a temperature in the range of from about 70 to about 120° C. during the initial stages of the chlorination, that is, up to approximately the formation of the monochloro derivative. After the monochloro stage has been reached, it is then preferred that the temperature be maintained at a higher level, such as in the range of from about 120 to about 170° C., as such higher temperatures enhance the formation of the polychloro derivative.

Inasmuch as one mol of hydrogen chloride gas is formed on the introduction of each atom of chlorine into the chloroacetic acid molecule, means should be provided for the efficient removal of this gas. This hydrogen chloride may be merely vented to the atmosphere or, if desired, absorbed in a suitable absorber, such as water or an alkaline solution. The chlorinator wherein the reaction is carried out should be equipped with an adequate condenser to prevent loss of the reactants or the desired reaction products during the chlorination process.

The desired product of the novel process of this invention is that product containing in excess of 90% trichloroacetic acid or convertible thereto by hydrolysis. According to the novel process of this invention, chlorination is continued until the reaction product obtained is such that upon the addition of water to the reaction product in an amount sufficient to hydrolyze the hydrolyzable impurities contained therein, a reaction product results having a crystallizing point in excess of 51° C. after removal of the hydrogen chloride gas. Such a reaction product will contain in excess of 90% of the trichloroacetic acid.

After the mixture of glacial acetic acid and acetic anhydride is chlorinated up to the above described stage, further introduction of chlorine into the mixture is stopped. The reaction product thus obtained may be utilized as such in subsequent industrial organic syntheses inasmuch as the trichloroacetyl chloride contained therein reacts with other compounds to produce the same compound as does trichloroacetic acid similarly reacted, or it may be treated with water to hydrolyze the trichloroacetyl chloride contained therein to trichloroacetic acid, thereby obtaining a reaction product containing in excess of 90% trichloroacetic acid and having a crystallizing point in excess of 51° C., after removal of the hydrogen chloride formed during this hydrolysis. Due to the nature of the reaction, the quantities of trichloroacetyl chloride and any other hydrolyzable impurities contained therein formed during the chlorination process, vary slightly from batch to batch. Consequently, it is not possible to specify the exact quantity of water to be added to the reaction product in order to completely hydrolyze these impurities. Generally, this quantity of water is of the order of from about 1% to about 5% by weight of the reaction product. Practically, however, the quantity of water added is that quantity of water at least sufficient to hydrolyze all of the hydrolyzable impurities contained in the reaction product resulting in a reaction product having a maximum crystallizing point in excess of about 51° C. after removal of the hydrogen chloride formed during the hydrolysis. Inasmuch as one molecular proportion of hydrogen chloride will be formed for each molecular proportion of trichloroacetyl chloride hydrolyzed, it is necessary to remove this hydrogen chloride if a reaction product having a crystallizing point in excess of 51° C. is desired. If the hydrogen chloride is not removed, it will depress the crystallizing point of the reaction product in much the same manner as does trichloroacetyl chloride.

In carrying out this hydrolysis reaction, the water may be added in small increments, determining the crystallizing point of the reaction product after the addition of each increment and removal of the hydrogen chloride formed during the hydrolysis and stopping the addition of water when the crystallizing point of the reaction product has reached a maximum in excess of about 51° C. A more convenient method for determining the amount of water to be added to the reaction product in order to raise the crystallizing point of the reaction product to a maximum in excess of about 51° C., is to withdraw from the reaction product a small weighed laboratory size sample and determine the quantity of water necessary to raise the crystallizing point of this sample to a maximum in excess of 51° C. From this result, the total quantity of water necessary to hydrolyze all of the hydrolyzable impurities in the entire batch of the reaction product may be calculated.

The actual hydrolysis is carried out by mixing the water with the reaction product, at a temperature in excess of the melting point of the reaction product, i. e., in excess of about 55° C., and preferably in the range of from about 55° C. to about 170° C. Higher temperatures may be utilized, but offer no significant advantage. The hydrogen chloride may be removed from the reaction product by any convenient method well known to those skilled in the art. For example, the evolution of hydrogen chloride may be permitted to proceed naturally, aided only by agitation of the reaction product, or the reaction product may be placed under reduced pressure. Although the crystallizing point of the reaction product, indicative of its purity is determined on a substantially hydrogen chloride free sample, all of the hydrogen chloride need not be removed from the reaction product at this stage. If the trichloroacetic acid thus prepared is to be utilized in a reaction wherein free hydrogen chloride will have no deleterious effect, complete removal of the hydrogen chloride need not be accomplished at this stage.

As was previously pointed out, due to the nature of the reaction product obtained in the novel process of this invention, prior to hydrolysis, the reaction product, prior to hydrolysis, may be used directly in various organic syntheses wherein commercial grade trichloroacetic acid is used as a reactant. Typical examples of such utility are the preparation of the salts of trichloroacetic acid and the esters of trichloracetic acid. In preparing the salts of trichloroacetic acid, trichloroacetic acid is reacted with an alkaline derivative of the desired salt forming element either in an aqueous medium or in a dry state. For example, sodium trichloroacetate would be prepared by reacting sodium hydroxide or sodium carbonate with trichloroacetic acid, either in the dry state or in an aqueous medium. If carried out in an aqueous medium, the trichloroacetyl chloride would be hydrolyzed to trichloroacetic acid which would then react with the alkaline material. If carried out in a dry state, the alkaline material would react directly with trichloroacetyl chloride, forming sodium trichloroacetate.

As a further example of the utility of the reaction product obtained in the novel process of this invention, prior to hydrolysis, is the preparation of esters of trichloroacetic acid. Inasmuch as trichloroacetyl chloride reacts with an alcohol to form the same ester of trichloroacetic acid as does trichloroacetic acid itself when reacted with the same alcohol, commercial grade esters of trichloroacetic acid may be prepared by merely esterifying the reaction product obtained herein prior to hydrolysis, with an alcohol.

The following examples illustrate these various utilities of the reaction product obtained according to the novel process of this invention:

*Example VI*

20 parts by weight of soda ash are placed in a suitable reaction vessel. With constant agitation, 60 parts by weight of the reaction product prior to hydrolysis obtained in Example III are slowly added over a period of one hour at a temperature of 60° C. After all of the reaction product has been added and the reaction mixture thoroughly mixed, the mass is allowed to cool to room temperature. The commercial grade of sodium trichloroacetate produced in accordance with this procedure has the following approximate analysis:

| | Per cent |
|---|---|
| Sodium trichloroacetic acid | 91.60 |
| Sodium dichloroacetic acid | 4.00 |
| NaCl | 1.96 |
| Na$_2$CO$_3$ | .09 |
| NaHCO$_3$ | 1.02 |
| H$_2$O | .82 |

In addition to the above described sodium trichloroacetate, the reaction product of the novel process of this invention, prior to hydrolysis, may be utilized in preparing other alkali metal salts of trichloroacetic acid, such as potassium and lithium salts, the alkaline earth metal salts such as the magnesium and calcium salts, the ammonium salt, etc.

*Example VII*

In a suitable esterification reaction vessel is placed 60 parts of the reaction product prior to hydrolysis as obtained in Example III and 35 parts of isopropyl alcohol. The esterification reaction is carried out by heating the reaction mixture thus obtained and distilling off the water of esterification formed. After the esterification reaction is complete, the isopropyl trichloroacetate thus produced was purified by means of a straight take-over distillation. The commercial grade of isopropyl trichloroacetate thus obtained has the following properties:

| | |
|---|---|
| Appearance | Colorless liquid |
| Free acidity as trichloroacetic acid | per cent__ 0.36 |
| H$_2$O | per cent__ 0.02 |
| N$_D^{25}$ | 1.440 |
| Sp. Gr. 25°/15.5° C. | 1.296 |

In addition to the above described isopropyl ester of trichloroacetic acid, the reaction product obtained according to the novel process of this invention prior to hydrolysis, may be esterified with other monohydric or polyhydric alcohols which may be either saturated or unsaturated, primary, secondary or tertiary, substituted or unsubstituted or aliphatic, aromatic or heterocyclic in nature. Among such alcohols are: primary alkyl alcohols such as methyl alcohol, ethyl alcohol, propyl alcohol, butyl alcohol, amyl alcohol, hexyl alcohol, heptyl alcohol, octyl alcohol, nonyl alcohol, decyl alcohol, undecyl alcohol, dodecyl alcohol, tetradecyl alcohol, cetyl alcohol, octadecyl alcohol, and the like;

Secondary alkyl alcohols such as isopropyl alcohol, secondary butyl alcohol, secondary amyl alcohol, secondary hexyl alcohol, secondary octyl alcohol, secondary nonyl alcohol, and the like;

Tertiary alkyl alcohols such as tertiary butyl alcohol, tertiary amyl alcohol, tertiary butyl carbinol, tertiary amyl carbinol, and the like;

Aromatic alcohols such as benzyl alcohol, methylphenylcarbinol, phenylmethyl alcohol, and the like;

Alicyclic alcohols such as cyclohexanol, cyclobutylcarbinol, cyclopentanol, and the like;

Heterocyclic alcohols such as furfuryl and tetrahydrofurfuryl alcohols, and the like;

Unsaturated aliphatic alcohols such as allyl alcohol, methallyl alcohol, crotyl alcohol, and the like;

Substituted alcohols such as ethoxy ethyl alcohol, ethylene chlorohydrin, cyanohydrin, 2-bromoethanol, and the like;

Polyhydric alcohols such ethylene glycol, propylene glycol, butylene glycol, 1,2-propanediol, glycerol, polyethylene glycols, and the like, in which cases the ester produced may be either the neutral or partial ester.

What is claimed is:

1. In a process for the production of trichloroacetic acid and compounds prepared therefrom, the step comprising chlorinating a mixture containing about 15% to about 75% glacial acetic acid and about 85% to about 25% acetic anhydride to approximately the trichloroacetic acid stage.

2. In a process for the production of trichloroacetic acid and compounds prepared therefrom, the step comprising chlorinating a mixture containing about 15% to about 75% glacial acetic acid and about 85% to about 25% acetic anhydride until a reaction product containing at least approximately 90% trichloroacetic acid is obtained.

3. In a process for the production of trichloroacetic acid and compounds prepared therefrom, the step comprising chlorinating a mixture containing about 15% to about 75% glacial acetic acid and about 85% to about 25% acetic anhydride to approximately the point where the addition of water to the reaction product thus formed in an amount sufficient to hydrolyze the hydrolyzable impurities contained therein results in a reaction product having a crystallizing point greater than about 51° C. after removal of the hydrogen chloride gas formed during the hydrolysis and containing in excess of about 90% trichloroacetic acid.

4. In a process for the production of trichloroacetic acid and compounds prepared therefrom, the step comprising chlorinating at a temperature in the range of from about 70° C. to about 170° C., a mixture containing about 15% to about 75% glacial acetic acid and about 85% to about 25% acetic anhydride to approximately the trichloroacetic acid stage.

5. In a process for the production of trichloroacetic acid and compounds prepared therefrom, the step comprising chlorinating at a temperature in the range of from about 70° C. to about 170° C., a mixture containing about 15% to about 75% glacial acetic acid and about 85% to about 25% acetic anhydride until a reaction product containing approximately 90% trichloroacetic acid is obtained.

6. In a process for the production of trichloroacetic acid and compounds prepared therefrom, the step comprising chlorinating at a temperature in the range of from about 70° C. to about 170° C., a mixture containing about 15% to about 75% glacial acetic acid and about 85% to about 25% acetic anhydride to approximately the point where the addition of water to the reaction product thus formed in an amount sufficient to hydrolyze the hydrolyzable impurities contained therein results in a reaction product having a crystallizing point in excess of 51° C. after removal of the hydrogen chloride gas formed during the hydrolysis and containing in excess of about 90% trichloroacetic acid.

7. In a process for the production of trichloroacetic acid and compounds prepared therefrom, the step comprising chlorinating a mixture containing about 15% to about 75% glacial acetic acid and about 85% to about 25% acetic anhydride up to approximately the point where the addition of water to the reaction product thus obtained in an amount sufficient to hydrolyze the hydrolyzable impurities contained therein, results in a reaction product having a crystallizing point in excess of 51° C. after removal of the hydrogen chloride gas formed during the hydrolysis and containing in excess of about 90% trichloroacetic acid, while maintaining during said chlorination a temperature in the range of from about 70° C. to about 120° C. until approximately the monochloro stage is reached, and then maintaining a temperature in the range of from about 120° C. to about 170° C. during the remainder of the chlorination period.

8. In a process for the production of trichloroacetic acid and compounds prepared therefrom, the step comprising chlorinating a mixture containing about 15% to about 75% glacial acetic acid and about 85% to about 25% acetic anhydride, while maintaining a temperature in the range of from about 70° C. to about 170° C., to approximately the point where the addition of water to the reaction product thus formed in an amount sufficient to hydrolyze the hydrolyzable impurities contained therein results in a reaction product having a crystallizing point greater than about 51° C. after removal of the hydrogen chloride gas formed during the hydrolysis and containing in excess of about 90% trichloroacetic acid, and thereafter adding water to the reaction product until the crystallizing point of the reaction product is greater than about 51° C. after removal of the hydrogen chloride formed.

9. In a process for the preparation of commercial grade trichloroacetic acid and compounds prepared therefrom, the step comprising adding to the reaction product obtained by chlorinating a mixture containing about 15% to about 85% glacial acetic acid and about 85% to about 25% acetic anhydride, while maintaining a temperature during said chlorination in the range of from about 70° C. to about 170° C., to approximately the point where the addition of water to the reaction product thus formed in an amount sufficient to hydrolyze the hydrolyzable impurities contained therein results in a reaction product having a crystallizing point greater than about 51° C. after removal of the hydrogen chloride gas formed during the hydrolysis and containing in excess of about 90% trichloroacetic acid, a quantity of water at least sufficient to raise the crystallizing point of said reaction product to a temperature greater than about 51° C. after removal of the hydrogen chloride formed.

10. In a process for the preparation of commercial grade trichloroacetic acid and compounds prepared therefrom, the step comprising contacting the reaction product obtained by chlorinating a mixture containing about 15% to about 85% glacial acetic acid and about 85% to about 25% acetic anhydride, while maintaining a temperature during said chlorination in the range of from about 70° C. to about 170° C., to approximately the point where the addition of water to the reaction product thus formed in an amount sufficient to hydrolyze the hydrolyzable impurities contained therein results in a reaction product having a crystallizing point greater than about 51° C. after removal of the hydrogen chloride gas formed during the hydrolysis and containing in excess of about 90% trichloroacetic acid, with a quantity of water at least sufficient to hydrolyze the hydrolyzable impurities present in said reaction product.

11. In a process for the preparation of commercial grade trichloroacetic acid and compounds prepared therefrom, the step comprising reacting the reaction product obtained by chlorinating a mixture containing about 15% to about 85% glacial acetic acid and about 85% to about 25% acetic anhydride, while maintaining a temperature during said chlorination in the range of from about 70° C. to about 170° C., to approximately the point where the addition of water to the reaction product thus formed in an amount sufficient to hydrolyze the hydrolyzable impurities contained therein results in a reaction product having a crystallizing point greater than about 51° C. after removal of the hydrogen chloride gas formed during the hydrolysis and containing in excess of about 90% trichloroacetic acid, under such conditions that the trichloroacetyl chloride contained in said reaction product is converted to the same compound as is the trichloroacetic acid also contained in said reaction product.

12. In a process for the production of commercially pure esters of trichloroacetic acid, the step comprising reacting an alcohol and a reaction product obtained by chlorinating a mixture containing from about 15% to about 75% glacial acetic acid and from about 85% to about 25% acetic anhydride to approximately the trichloroacetic acid stage.

13. In a process for the production of salts of trichloroacetic acid, the step comprising reacting an alkaline derivative of a salt forming group and a reaction product obtained by chlorinating a mixture containing from about 15% to about 75% glacial acetic acid and from about 85% to about 25% acetic anhydride to approximately the trichloroacetic acid stage.

CHARLES M. EAKER.

REFERENCES CITED

The following references are of record in the file of this patent:

UNITED STATES PATENTS

| Number | Name | Date |
|---|---|---|
| 1,757,100 | Strosacker | May 6, 1930 |
| 2,539,238 | Eaker | Jan. 23, 1951 |

FOREIGN PATENTS

| Number | Country | Date |
|---|---|---|
| 638,117 | Germany | Nov. 10, 1936 |